Oct. 30, 1973  D. F. WILEY  3,769,380
METHOD FOR EXTRUDING SYNTHETIC THERMOPLASTIC SHEET
MATERIAL HAVING A VARIEGATED COLORED PATTERN
Filed May 3, 1971

INVENTOR
DONALD F. WILEY
BY
M. NORWOOD CHEAIRS
ATTORNEYS

United States Patent Office 3,769,380
Patented Oct. 30, 1973

3,769,380
METHOD FOR EXTRUDING SYNTHETIC THERMO-PLASTIC SHEET MATERIAL HAVING A VARIEGATED COLORED PATTERN
Donald Field Wiley, Big Springs, Tex., assignor to Cosden Oil & Chemical Company, Big Spring, Tex.
Filed May 3, 1971, Ser. No. 139,512
Int. Cl. B29c 9/00; B29f 3/12
U.S. Cl. 264—40                                    13 Claims

ABSTRACT OF THE DISCLOSURE

A first extruded stream of molten synthetic thermoplastic material and a second extruded stream of differently colored molten thermoplastic material are combined in a conduit to provide a composite stratified stream having adjacent differentially colored layers extending longitudinally of the stream and having a relatively sharply defined interface therebetween. The composite stream is is then passed through a sheet form extrusion die having its die lips generally aligned with the aforesaid interface, whereby there is produced composite synthetic thermoplastic sheeting having a variegated colored pattern, advantageously a wood-grain type pattern, on at least a portion thereof. The patterned effect is achieved by controlling the temperature of each stream of thermoplastic material to provide a differential in the adjusted melt viscosities of the molten synthetic thermoplastic material and/or the relative output volumes for the individual thermoplastic streams before combination.

BACKGROUND OF THE INVENTION

The present invention relates to the co-extrusion of synthetic thermoplastic sheet material, and more especially, to the manufacture of such material having a variegated colored pattern on at least a portion thereof.

The demand for thermoplastic sheet material having decorative surface effects has grown very rapidly in the last few years. This demand has resulted from widespread acceptance of plastic sheet material for use as decorative and/or protective surface coatings or veneers adhered to solid substrate material, as well as for use as rigid decorative stock material in its own right. An increasingly popular application for decorative plastic sheeting resides in the production of articles having a wood-grain type finish. For example, interior and exterior paneling, table tops, counter tops and the like are now commonly fabricated entirely from non-naturally derived wood or wood-simulating components because of the shortage of high grade lumber products, and oftentimes because superior functional properties are obtainable by the use of synthetic materials. Thus, any of the above-mentioned articles may be fabricated from an inner core of fiberboard, chipboard, or the like provided with one or more veneers of a synthetic plastic sheet material displaying a wood-grain pattern.

The production of synthetic plastic sheet material having a wood-grain or similarly decorative pattern typically involves rather complex laminating techniques, e.g., high pressure laminates in melamine table top material (Formica) are expensive to produce and employ an adhesive system. Moreover, if extrusion techniques are employed to produce such material, there is usually necessitated the employment of specially designed extrusion apparatus. As a result, this latter method has not been readily, successfully adapted to the manufacture of synthetic plastic sheet material having a wood-grain or similar type pattern.

SUMMARY OF THE INVENTION

It is therefore an object of this invention to provide a method for the manufacture of synthetic thermoplastic sheeting having a variegated colored pattern, advantageously a wood-grain type pattern, utilizing co-extrusion techniques.

Another object of the invention resides in the provision of a process for the manufacture of synthetic thermoplastic sheeting having a wood-grain type pattern, which process does not require the employment of special extrusion apparatus, but rather utilizes conventionally designed apparatus.

It is another object of the invention to provide a method for the manufacture of synthetic thermoplastic sheet material having a wood-grain type design wherein the design is confined almost wholly within a surface layer of the sheet material.

Accordingly, in accomplishing the objects of this invention, there is provided a process for the manufacture of synthetic thermoplastic sheeting having a variegated colored pattern on at least a portion thereof, comprising combining in a conduit a first extruded stream of molten synthetic thermoplastic material and a second extruded stream of a differently colored molten thermoplastic material to provide a composite stratified stream having adjacent differentially colored layers extending longitudinally of the stream, with adjacent layers having a relatively sharply defined interface therebetween. The composite stream is thereafter passed through a sheet-form extrusion die having its die lips generally aligned with the aforementioned interface. The desired patterning in the resultant sheet material is attained by providing that the adjusted melt viscosities of the molten synthetic thermoplastic streams differ from one another by a sufficient degree so that the pattern is produced by merely extruding the composite stream through the sheet-form die and/or by controlling the relative output volumes at which each molten thermoplastic stream is extruded prior to combination thereof. Other variables affecting to some lesser degree the quality of the variegated colored pattern produced are the temperatures of the polished cooling rollers employed to treat the sheet material as it leaves the extrusion die.

Other objects, features and advantages of the invention will become apparent from the following description when taken in conjunction with the accompanying drawings, wherein like reference numerals are used to indicate like or equivalent parts.

DETAILED DESCRIPTION OF THE INVENTION

Figure 1:
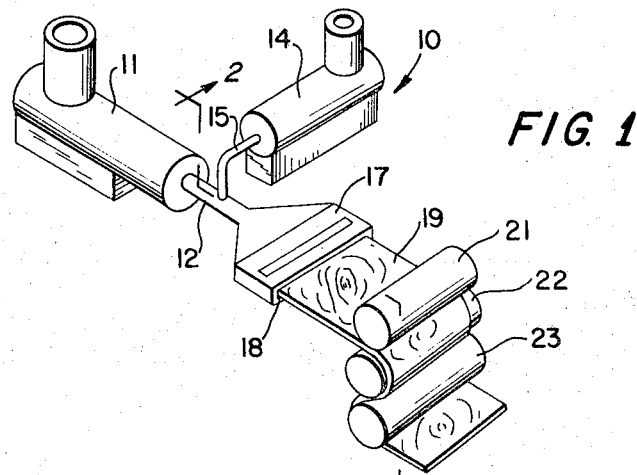
FIG. 1 schematically represents an apparatus for the preparation of synthetic thermoplastic sheeting having a variegated colored pattern in accordance with the method of the invention.

In accordance with this invention, it has been discovered that synthetic thermoplastic sheeting having a wood-grain or similar type pattern may be produced by a process employing co-extrusion techniques, but not necessitating the employment of specially adapted or expensive extrusion apparatus. Specifically, the invention resides in the discovery that sheet material displaying interesting and attractive designs, especially wood-grain type designs, can readily be produced by coextruding two or more streams of differently colored synthetic thermoplastic material utilizing conventional extrusion apparatus. Instead of producing the desired design characteristics by mechanical aberration of the differently colored plastic streams as for example by including agitators, oscillators, or specially designed extrusion dies into the apparatus, in accordance with this invention the desired results are obtained by carefully controlling the physical properties of the co-extruded thermoplastic streams and/or the relative rates at which these streams are co-extruded.

One of the two most important parameters affecting successful production of extruded sheet material having the desired pattern characteristics is the relative melt viscosity achieved between the plurality of co-extruded thermoplastic materials. In order to produce a wood-grain or similar type pattern, a significant difference in intrinsic or adjusted melt viscosity of the differentially colored molten thermoplastic materials is employed. For example, if two independent streams of molten thermoplastic material are joined in a conduit and subsequently co-extruded into sheet form, one of the streams of thermoplastic material, preferably the upper stream of material, is significantly less fluid than the other stream of thermoplastic material. This difference in fluidity can be achieved either by initially selecting two types of thermoplastic material which are characterized by different intrinsic viscosity values, e.g., these may be different types of thermoplastic synthetic resins inherently possessing different melt viscosity characteristics or may be the same type of thermoplastic synthetic resin having different molecular weights, additives, etc., resulting in different intrinsic melt viscosity values, or alternatively, the individual streams of thermoplastic material may be of like intrinsic viscosity but have their actual melt viscosity adjusted under co-extrusion conditions, as for example by heating one stream to a higher extrusion temperature than the other, to achieve the necessary differential in viscosity conditions. If the intrinsic or adjusted melt viscosities of the two molten thermoplastic streams are nearly identical and fall within the range normally employed in extrusion processes and are co-extruded at approximately the same rates, the top layer will merely spread out as a substantially uniform surface layer on the lower substrate coextrudate layer and no pattern effect will be achieved. On the other hand, if the intrinsic or adjusted melt viscosity of the upper or superstrate layer is significantly higher than that of the substrate layer, such that it exhibits a significantly less fluid condition, upon co-extrusion of a single combined stream of the two thermoplastic materials, there will be formed sheet material displaying the desired wood-grain type pattern.

Another variable affecting the pattern in co-extruded sheeting is the relative volume at which the individual molten thermoplastic streams are extruded before combination in a single conduit. This variable does not so much affect production of the pattern itself, but rather determines how pronounced will be the resultant pattern. As the relative output volumes of the individual extruded streams become more divergent, the more pronounced is the woodgrain type pattern. Actually what is involved is an interplay between the intensity of color and the thickness of the surface layer. Accordingly, the amount of pigment in the color concentrate layer as well as the depth of this layer are controlling elements of depth or density of pattern and color. While the divergent relative output volumes of two or more thermoplastic streams may be used alone to produce a variegated pattern, generally it is preferred to employ such technique in combination with the use of thermoplastics of different intrinsic or adjusted viscosities.

In a preferred embodiment of the invention, the desired wood-grain type patterns are produced by coextruding two streams of thermoplastic material such that only a thin surface layer of colored plastic material, e.g., on the order of 1 or 2 mils or less, is applied on a thicker sublayer, e.g., 10 mils up to about ⅜ inch, of a differently colored or preferably uncolored material. This results in a satisfactory surface pattern and concomitantly in a saving in the amount of more expensive pigmented or colored material. Furthermore, this arrangement allows for the use of a relatively inexpensive substrate material in conjunction with limited amounts of another typically more expensive thermoplastic material which may be chosen to produce a variety of desired surface properties in the resultant sheeting, e.g., chemical resistance, abrasion resistance, resistance to oils, etc., in addition to producing the variegated pattern.

There is no absolute limitation upon the relative volumetric feed rates for the individual streams of thermoplastic material. These values will vary greatly depending on the type of thermoplastic material employed and also upon the thickness of sheeting produced. Further, the values used will depend upon the desired degree of patterning to be achieved.

In the preferred embodiment of the invention discussed above, the superstrate layer advantageously constitutes less than about 20 or 25% by volume of the total thermoplastic material. More preferably, the volume content of the superstrate material is less than about 15%.

Referring now to the drawings, in FIG. 1 there is schematically illustrated an apparatus, generally designated by the reference numeral 10, particularly adapted for the process of the invention. The apparatus 10 comprises in cooperative combination a first extruder 11 for the extrusion of a molten thermoplastic material, and connected thereto, a discharge conduit 12. A second extruder 14 having a discharge conduit 15 is adapted to provide a second stream of molten thermoplastic material. Conduit 15 terminates at conduit 12 at a point upstream of the sheeting die 17 which is in operative communication with conduit 12 and receives the flow therefrom. Sheet 19 is formed at the die lips 18 and thereafter is carried from the die by means of polished cooling rollers 21, 22 and 23.

Figure 2:
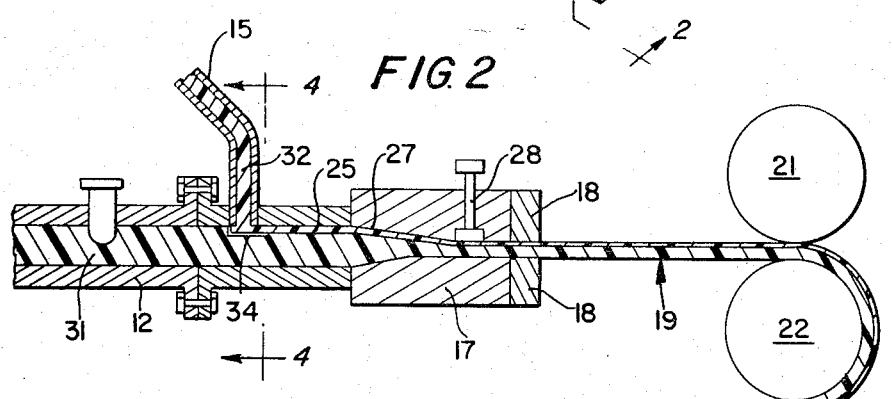
FIG. 2 is a cross-sectional view taken along the line 2—2 in FIG. 1.

In FIG. 2 there is illustrated a sectional view of the discharge conduits 12 and 15, extrusion die 17 and cooling roller arrangements 21, 22 and 23. This view illustrates the inner section of conduits 12 and 15, and the configuration of the two molten thermoplastic material streams 31 and 32 as they are combined in conduit 12 to form a stratified stream having an interfacial junction plane or surface 25. Stratification of the intersection point of the two streams is aided by metal plate 34 positioned in conduit 12 adjacent the entry point of co-extruder discharge conduit 15. Similarly, there is illustrated the passage of the stratified resin stream into the die manifold 27, past restricter bar 28 and ultimately through the extruder die lips 18 to the cooling roller assembly. Throughout the entire traversal of the extrusion equipment, it is noted that the individual layers of thermoplastic material essentially maintain their stratified relationship to form a final product having a surface layer of non-uniform coloration of one thermoplastic material displaying a patterned effect because of the difference in melt viscosity between the adjacent co-extruded layers and/or the relative volumetric feed rates of the extruded thermoplastics.

Figure 3:
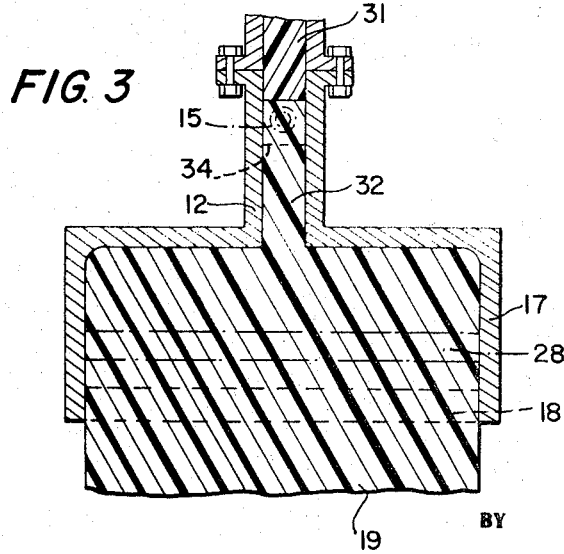
FIG. 3 is a top view, in section, of the extrusion die and lead-in conduit portion of the apparatus illustrated in FIG. 1.
Figure 4:
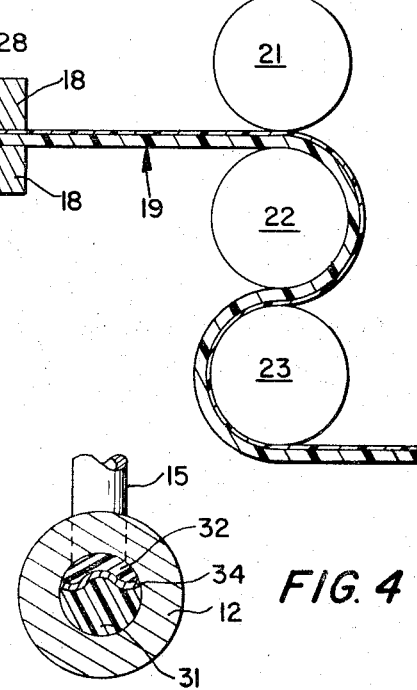
FIG. 4 is a cross-sectional view taken along the line 4—4 in FIG. 2.

In FIG. 3 is illustrated a top view of the conduit 12 and extrusion die 17 to demonstrate the formation of the wood-grain type surface pattern as well as the lateral flow pattern of molten thermoplastic material as it passes into and through the extrusion die. FIG. 4 illustrates the preferred configuration of metal plate 34 positioned in conduit 12.

As noted hereinabove, to produce a woodgrain or similar type pattern on the extruded sheet material it is necessary that there be a significant difference between the melt viscosity of the thermoplastic co-extrudate materials and/or a significant difference between the relative volumetric feed rates of such materials. It will be appreciated that the degree of difference in relative melt viscosity cannot be defined with preciseness because different thermoplastic materials behave in different manners, some requiring greater or lesser degrees of difference in melt viscosity to produce the desired pattern effect. However, as a general rule it has been found that a differential of at least about 25% between melt viscosity values under actual extrusion conditions is preferred when the substrate material is of the lesser viscosity and that such differential be not greater than about 25% when the substrate material is of the greater viscosity. If the melt viscosity values for co-extruded thermoplastic streams become too divergent, as for example beyond the above range of about 25% when the substrate is of the greater viscosity or about 100% when the substrate is of the lesser viscosity, simultaneous extrusion of the different materials to produce variegated patterns becomes difficult or impossible and furthermore, problems are sometimes encountered in achieving good adherence between the various layers of the co-extruded product.

Every thermoplastic material may be characterized by an intrinsic melt viscosity under standard test conditions. These values convey to one of ordinary skill in the art of the information necessary to properly select complementary thermoplastic materials which may operatively be employed in the process of the invention. Beyond this, however, it is well known to the ordinary skilled artisan that two materials displaying nearly identical melt viscosities under standard test conditions may be subjected to dissimilar processing conditions whereby their adjusted melt viscosities under actual extrusion conditions will vary significantly from one another. Accordingly, both the intrinsic and adjusted melt viscosity of the thermoplastic co-extrudate materials must be taken into account in the context of the present invention. As a result, two materials displaying nearly identical intrinsic melt viscosities, or even a single thermoplastic material, can be employed as the individual differentially colored components in the process of the invention if each material is separately extruded under different temperature conditions to produce a sufficient difference in adjusted melt viscosity.

In this regard, it will be appreciated that no exact limits may be placed upon the various temperature conditions employed in the co-extrusion process of the invention. Obviously, since a multitude of thermoplastic materials may be employed in the subject process, it is apparent that each type of material will require processing conditions more or less individually tailored to its own properties. For any of the thermoplastic materials commonly employed in extrusion processes, these processing conditions are a matter of ordinary skill in the art. Likewise, it is considered within the level of ordinary skill in the art to vary the extrusion temperature of one component so as to modify or adjust its melt viscosity under actual operating conditions to render it sufficiently dissimilar to the melt viscosity of a second material, co-extruded therewith, which displays an intrinsic viscosity very close or identical to that of the first material. The present invention resides not in the choice of particular operating conditions for any particular combination of plastic materials, but rather in the basic principles which would lead one of ordinary skill in the art to desire such a choice of parameters.

Once the melt viscosity differences have been selected so that the desired decorative pattern may be produced by co-extrusion of a composite melt stream into sheet material, the degree or intensity of that pattern may be further affected by adjusting the relative output quantity at which the individual yet uncombined streams of thermoplastic material are first extruded. When the output volume ratios decreases toward equal volumes, the pattern in the extruded sheet becomes less pronounced than if the relative extruder outputs are more unequal. In the preferred embodiment of the invention wherein a relatively thin upper layer of thermoplastic colored material is co-extruded with a thicker sub-layer of uncolored thermoplastic material, the relative output volume at which the surface layer stream is extruded can vary over a relatively wide range. Typically, and preferably, the relative volume of the superstrate material varies from a maximum of about 25% to a minimum limited only by the ability of the surface layer material to satisfactorily cover the sub-layer.

In the same manner as adjustment of relative output rates of the co-extruded thermoplastic materials having different melt viscosities is employed to make more or less pronounced the pattern resulting from use such thermoplastic materials divergent output rates of such materials may be used to produce a pattern when co-extruding thermoplastic materials or similar melt viscosities. To so employ relative output rates of the co-extruded thermoplastic materials, generally, the output rate of the superstrate thermoplastic is adjusted such as to provide superstrate in volume of no greater than about 5% of the amount of substrate extruded. Within such percentage, however, the output rate of superstrate usually is such as to provide a superstrate surface layer of no greater than 10 mils thickness, more often 5 mils, and preferably 2 mils thickness.

It will be readily appreciated that the ultimate pattern produced in the co-extruded sheet material of the invention as well as the various degrees of intensity resulting for any given pattern is the result of complex interaction between intrinsic melt viscosity of the selected thermoplastic materials, the relative extrusion temperatures for each thermoplastic material and the relative output volume at which each thermoplastic material is extruded before combination into a single stream. Accordingly, it is apparent that a wide choice of operating conditions may be envisioned depending upon the particular results desired at any given time by any given operator of the co-extrusion apparatus. It is therefore not feasible or proper to put precise limitations upon these various process parameters.

A further operating condition affecting to some degree the ultimate pattern produced in a co-extruded sheet is the temperature conditions prevailing in the cooling rollers through which the sheet product passes after leaving the extrusion die lips. The manufacture of smooth sheeting generally requires the use of standard highly polished rollers, e.g. chrome, typically three in number, each being adapted for internal circulation of cooling water. These rollers are typically operated within the temperature range of approximately 75 to 200° F. The higher the temperature of the cooling rolls, especially the uppermost roll, the more effect may be seen as regards the actual pattern of the extruded sheet material.

Other processing variables of lesser importance include the pressures at which the individual thermoplastic material streams are extruded before combination. These pressures are of little significance and typically fall within the range of approximately 500 to 3,000 p.s.i. for each stream. Of course, the downstream pressure at the point where the streams intersect is equal in both streams.

The process of the invention is broadly applicable to any of the conventional thermoplastic synthetic resinous materials which are capable of being successfully formed by extrusion techniques. Individual streams of thermoplastic material may consist of the same or different types of plastic, and either one or both may be colored by addition of appropriate dyes, pigments or the like, so long as there are employed at least two streams having different colors. The only additional requirements placed upon the thermoplastic materials chosen is that any two co-extruded layers have the capacity of adhering together, at least to some degree.

A preferred class of materials for use in the present invention comprises the polystyrenes which include both homopolymers of styrene and copolymers of styrene with other polymerizable and polymerized monomers. Included within the latter category are impact polystyrenes which comprise graft copolymers of styrene upon conjugated diene backbone polymers such as polybutadiene, butadiene-styrene copolymers, butadiene-acrylonitrile copolymers, natural rubber, etc. Likewise, included in this category are normal interpolymers of styrene with other well known, conventional monomers. Advantageously, both the surface layer and sublayer of coextruded sheets produced in accordance with the invention may be comprised of styrene polymers. Equally advantageous results are obtained by utilizing as the surface layer other types of synthetic polymeric resins which will form a firmly adhering layer upon the polystyrene sublayer. Exemplary of the latter synthetic thermoplastic materials are the ABS polymers, vinylidene fluoride polymers, polyphenylene oxides and the family of polymers based upon acrylic and methacrylic acid esters. A great variety of the foregoing polymer types are available commercially, together with molecular weight, melt index and/or melt viscosity data sufficient to apprise those of ordinary skill in the art as to their suitability for use in the process of this invention.

By way of general illustration, in a co-extrusion process according to the invention there may be employed two molten stream of polystyrene as co-extrudates, i.e., a main substrate stream of naturally colored, i.e., white, polystyrene and a second smaller side stream of color concentrated polystyrene as a surface coating stream. In such a system, the color concentrated polystyrene stream advantageously comprises between about 0.2% and 25% of the total combined stream of thermoplastic material. Individual extrusion temperatures for each of the polystyrene streams typically range between about 400° F. and 500° F. The intensity of the ultimate pattern produced may be readily varied from its least pronounced degree when the extruder output quantities for the two streams are least divergent, to its most pronounced degree when the output volume of the side extruder is lowered to less than 5% of the main extruder supplying the substrate layer. Typically, the top roller of the three cooling rollers will be operated within the temperature range of 120 to 160° F., the center roller within the range of 75 to 180° F. and the bottom roller at a temperature such as to get good lay down but no sticking to the roller, e.g., typically about 150° F. Pressures of between 10 and 20 p.s.i. minimum are exerted between the rollers.

It will be appreciated that sheet material may be produced in accordance with the invention displaying a pattern effect on both sides of the sheet. Such an embodiment merely requires that various minor modifications be made in the physical equipment employed to carry out the process. Likewise it will be appreciated that various types of extrusion dies may be substituted for the one presently illustrated, e.g., end-fed die.

The following specific examples are provided to facilitate a better understanding of the invention, it being understood that the same are intended to be merely illustrative and in no wise limitative.

Example 1

A main resin stream of impact polystyrene (Cosden Oil & Chemical Co. 825D pellets (white); melt flow rate by extrusion plastometer (A.S.T.M. D-1238-63T) condition G=3.0 grams/10 minutes; Brabender Torque=370 meter-grams (10 min.)) is extruded from a 4½ inch diameter two stage vented extruder containing a 4:1 compression ratio screw. A 1¼ inch diameter 24:1 single stage side extruder also having a 4:1 compression ratio screw is arranged as illustrated in FIGS. 1 and 2 and supplies a second stream of color concentrated polystyrene (Cosden Oil & Chemical Co. 550 pellets and 100-014c Brown concentrate; melt flow rate by extrusion plastometer (A.S.T.M. D-1238-63T) condition G=2.0 grams/10 minutes; Brabender Torque=330 meter-grams (10 minutes)). The main polystyrene stream is extruded at a temperature of 460° F. and at a speed of approximately 123 r.p.m. (1100 lbs./hr.), and the color concentrated polystyrene stream is extruded at a temperature of 430° F. and at varying speeds of 22 r.p.m., 44 r.p.m. and 88 r.p.m. (2.5, 6.25 and 17 lbs./hr. respectively).

The two resinous streams are then combined in a discharge conduit of the 4½ inch diameter extruder utilizing a baffle plate arrangement illustrated in FIG. 4. There results a single stratified bi-component stream having an arcuate interface between the uncolored and color concentrated polystyrene layers. The bi-component stream is conducted to a center-fed sheet-form extrusion die which opens to an extrusion slit 40 inches wide with its lips set at approximately 110 mils. The die temperature averages about 440° F.

Upon leaving the die lips, the extruded sheet passes through a series of three 12 inch polished chrome cooling rolls, the top roll maintained at 100° F., the middle roll at 75° F. and the bottom roll at 150° F. Roll pressures at top and bottom are maintained at 0 p.s.i. (not touching) and 150 p.s.i. respectively, and at a gap setting of 110 mils. The polishing and subsequent rubber rolls are operated at about 4% excess speed to stretch the extruded sheet to a final thickness of 105 mils.

Examination of the final sheeting product evidences a non-uniform layer of the color concentrated polystyrene resin upon the uncolored polystyrene base layer. This surface layer is characterized by a pattern closely simulating that of natural wood grain. The pattern evidences zones of varying intensity corresponding to the changes in side extruder output. In the sheeting extruded at 22 r.p.m. the pattern is most pronounced, and in that wherein the side extruder speed was 88 r.p.m. the pattern is less noticeable.

Example 2

A main resin stream of impact polystyrene (Cosden Oil & Chemical Co. 825D pellets (white); melt flow rate by extrusion plastometer (A.S.T.M. D-1238-63T) condition G=3.0 grams/10 minutes; Brabender Torque=370 meter-grams (10 min.)) is extruded from a 4½ inch diameter two stage vented extruder containing a 4:1 compression ratio screw. A 1¼ inch diameter 24:1 single stage side extruder also having a 4:1 compression ratio screw is arranged as illustrated in FIGS. 1 and 2 and supplies a second stream of color concentrated polyphenylene oxide (General Electric Co.—Noryl PPO—Blue Color Type SE-1; Brabender Torque=1350 meter-grams (10 min.); melt flow rate by extrusion plastometer (A.S.T.M. D-1238-63T) condition G=0 grams/10 min.). The main polystyrene stream is extruded at a temperature of 440° F. and at a speed of approximately 100 r.p.m. (900 lbs./hr.), and the polyphenylene oxide side stream is extruded at a temperature of 550° F. and at a speed of 100 r.p.m. (20 lbs./hr.).

The two resinous streams are then combined in a discharge conduit of the 4½ inch diameter extruder utilizing a baffle plate arrangement illustrated in FIG. 4. There results a single stratified bi-component stream having an arcuate interface between the uncolored and color concentrated thermoplastic layers. The bi-component stream is conducted to a center-fed sheet-form extrusion die which opens to an extrusion slit 40 inches wide with its lips set at approximately 57 mils. The die temperature averages about 475° F.

Upon leaving the die lips, the extruded sheet passes through a series of three 12 inch polished chrome cooling rollers, the top roller maintained at 120° F., the middle roller at 160° F. and the bottom roller at 140° F. Roll pressure at top and bottom are maintained at 20 p.s.i., and the rollers are gapped at 54 mils. The polishing and subsequent rubber rolls are operated at about 5% excess speed to stretch the extruded sheet to a final thickness of 54 mils.

The ultimate sheet product evidences a very pronounced blue and white wood-grain pattern on its surface.

Thus, there has been provided according to the invention a process for producing extruded sheeting of synthetic thermoplastic material, which sheeting displays decorative wood grain or similar type patterns. A salient feature of the subject process resides in the fact that conventionally designed extrusion equipment may be employed to carry out the process.

While the fundamental novel features and advantages of the invention have been pointed out in connection with a single illustrated embodiment thereof, it will be appreciated that various obvious modifications to the subject co-extrusion process will suggest themselves to one of ordinary skill in the art. Therefore it is intended to be limited only by the scope of the following claims.

What is claimed is:

1. A process for the manufacture of synthetic thermoplastic sheeting having a simulated wood grain pattern extending across substantially the entire width of at least one surface thereof comprising conveying a first, major heat plasticized stream of thermoplastic material comprising at least 75% by volume of the total thermoplastic material in a conduit having a generally circular cross-section, continuously joining to the exterior surface of said first stream within the first conduit a second, minor stream of a second heat plasticized thermoplastic material comprising less than 25% by volume of the total thermoplastic material having a different color than said first thermoplastic material, thereby forming a single stratified stream of heat plasticized thermoplastic material conforming to the cross-section of said conduit and being characterized by distinct contiguous layers of said thermoplastic materials having an interface therebetween, said interface terminating at each end at a point on the circumference of said conduit, conveying said composite stream through said conduit in the absence of internally or externally supplied mixing stimulus to a sheet form extrusion die having its dye lips generally aligned with the said interface between the two thermoplastic materials, regulating the temperature of each of said major and minor streams of thermoplastic material under actual co-extrusion conditions to adjust the melt viscosities of said streams so that said melt viscosities differ by a degree sufficient to produce a continuous surface layer of said second thermoplastic material exhibiting said simulated wood grain appearance upon passage through said extrusion die, and passing said composite stream of molten material through the said die.

2. The process as defined by claim 1, wherein said first stream of thermoplastic material comprises a styrene polymer.

3. The process as defined by claim 2, wherein said second stream of thermoplastic material comprises a styrene polymer.

4. The process as defined by claim 2, wherein said second stream of thermoplastic material comprises an ABS polymer.

5. The process as defined by claim 2, wherein said second stream of thermoplastic material comprises a vinylidene fluoride polymer.

6. The process as defined by claim 2, wherein said second stream of thermoplastic material comprises an acrylic ester polymer.

7. The process as defined by claim 2, wherein said second stream of thermoplastic material comprises a polyphenylene oxide polymer.

8. The process as defined by claim 1, wherein said second stream is of higher viscosity than said first stream.

9. The process as defined by claim 8 wherein the melt viscosity of said streams of thermoplastic material differ by a factor of at least about 25%.

10. The process as defined by claim 1, wherein said second stream is of lower viscosity than said first stream.

11. The process as defined by claim 10, wherein the melt viscosity of said streams of thermoplastic material differ by a factor of no greater than 25%.

12. The process as defined by claim 1, further comprising lowering the relative volumetric proportion of said second, minor stream of thermoplastic material to less than 15% by volume, whereby a more pronounced simulated wood grain pattern is produced upon extrusion of said composite stream through said die.

13. The process as defined by claim 1, further comprising lowering the relative volumetric proportion of said second minor stream of thermoplastic material to about 5% by volume, whereby a more pronounced simulated wood grain pattern is produced upon extrusion of said composite stream through said die.

References Cited

UNITED STATES PATENTS

| | | | |
|---|---|---|---|
| 2,985,556 | 5/1961 | Rowland | 264—171 |
| 3,423,498 | 1/1969 | Lefevre | 264—171 |
| 3,405,425 | 10/1968 | Buckley et al. | 264—245 |
| 3,444,031 | 5/1969 | Schrenk | 264—171 |
| 3,576,707 | 4/1971 | Schrenk et al. | 264—171 |
| 3,562,379 | 2/1971 | Duggins | 264—171 |
| 3,218,971 | 11/1965 | Rowland | 101—401.1 |
| 3,549,405 | 12 1970 | Schrenk et al. | 264—171 |
| 3,513,060 | 5/1970 | Krystof | 264—171 |
| 3,608,013 | 9/1971 | Ingham | 264—171 |

ROBERT F. WHITE, Primary Examiner

J. R. THURLOW, Assistant Examiner

U.S. Cl. X.R.

264—75, 171, 245